United States Patent
Ahlquist et al.

[11] Patent Number: 6,095,417
[45] Date of Patent: Aug. 1, 2000

[54] APPARATUS AND METHOD FOR READING BAR CODES ON A MOVING WEB

[75] Inventors: Gary W. Ahlquist, Webster; Thomas J. Clifford, Jr., Rochester; Andrew Zwickl, Jr., Penfield, all of N.Y.

[73] Assignee: Eastman Kodak Company, Rochester, N.Y.

[21] Appl. No.: 09/059,719

[22] Filed: Apr. 7, 1998

[51] Int. Cl.⁷ .................................................. G06K 7/10
[52] U.S. Cl. .................. 235/454; 250/205; 235/455; 235/462.05; 235/462.26; 235/462.42
[58] Field of Search .................................. 235/455, 454, 235/472.01, 462.26, 462.42, 462.05; 250/201.1, 205, 559.11

[56] References Cited

U.S. PATENT DOCUMENTS

| | | | |
|---|---|---|---|
| 2,251,306 | 8/1941 | Thompson | 250/41.5 |
| 2,323,843 | 7/1943 | Richter et al. | 41/4 |
| 2,928,949 | 3/1960 | Steinbuch | 250/206 |
| 3,437,833 | 4/1969 | Razaitis et al. | 307/231 |
| 3,700,908 | 10/1972 | Devaney, Jr. | 250/219 DR |
| 3,949,233 | 4/1976 | Gluck | 250/555 |
| 4,097,731 | 6/1978 | Krause et al. | 250/205 |
| 4,097,732 | 6/1978 | Krause et al. | 250/205 |
| 4,528,444 | 7/1985 | Hara et al. | 235/462 |
| 4,698,514 | 10/1987 | Hilmersson et al. | 250/566 |
| 4,818,852 | 4/1989 | Haddock et al. | 235/488 |
| 4,856,820 | 8/1989 | Kasprzak et al. | 283/81 |
| 4,864,631 | 9/1989 | Jensen | 382/61 |
| 4,985,636 | 1/1991 | Fukui et al. | 250/559 |
| 5,008,520 | 4/1991 | Georgiou et al. | 235/462 |
| 5,083,816 | 1/1992 | Folga et al. | 283/81 |
| 5,227,643 | 7/1993 | Craig et al. | 250/566 |
| 5,248,871 | 9/1993 | Takenaka | 235/462 |
| 5,250,813 | 10/1993 | Takahashi et al. | 250/561 |
| 5,258,610 | 11/1993 | Atanovich | 250/222.1 |
| 5,280,162 | 1/1994 | Marwin | 235/462 |
| 5,287,434 | 2/1994 | Bain et al. | 395/101 |
| 5,289,011 | 2/1994 | Wong et al. | 250/561 |
| 5,345,091 | 9/1994 | Craig et al. | 250/566 |
| 5,352,879 | 10/1994 | Milch | 235/466 |
| 5,514,864 | 5/1996 | Mu-Tung et al. | 250/205 |
| 5,524,993 | 6/1996 | Durst | 400/279 |
| 5,550,362 | 8/1996 | Sherman | 235/455 |
| 5,635,704 | 6/1997 | Del Signore, II et al. | 250/205 |

*Primary Examiner*—Karl D. Frech
*Assistant Examiner*—Jamara Franklin
*Attorney, Agent, or Firm*—Clyde E. Bailey, Sr.

[57] ABSTRACT

An apparatus (10) and method for reading bar codes (12) on a moving web (14) has a LED light source (16) that transmits a beam of light (18o) through the advancing web (14). A scanner (20) is arranged on a side of the web (14) opposite the light source (16) for detecting the characteristic light intensity levels corresponding to various optical densities of the web (14). Output signals from the scanner (20) are processed and manipulated for adjusting the light intensity levels of the light source (16) to within predetermined limits.

11 Claims, 4 Drawing Sheets

APPARATUS AND METHOD FOR READING BAR CODES ON A MOVING WEB

MICROFICHE APPENDIX

The disclosure in the microfiche appendix of this patent disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

FIELD OF THE INVENTION

The present invention is directed to an apparatus and method for reading indicia, and more particularly, the invention concerns an apparatus and method that utilizes a transmissive light mode to read bar codes on a moving web having a range of optical densities.

BACKGROUND OF THE INVENTION

Generally, bar code indicia which includes contrast changes, typically black bars to white bars and white bars to black bars, are scanned using reflective illumination techniques. For instance, U.S. Pat. No. 4,698,514 discloses bar code markings on webs read reflectively. Reflectively reading bar codes involves illuminating the bar code using a light source, typically a light emitting diode (LED) or laser diode, and collecting indirect scattered reflections back into a scanning system. The collected reflections are focused on a photoelectric detector of some kind. Most systems of this type are designed and fixed to work over a broad range of print contrast between the bars and spaces of the bar code indicia or symbols. Some systems do provide for the ability to adapt themselves to changes in contrast or reflectance. One technique may be the use of automatic gain control system (AGC) in the input circuitry of the sensor as described, for instance, in U.S. Pat. Nos. 3,949,233, 4,528,444, and 5,248,871. Further, U.S. Pat. No. 4,985,636 discloses the use of variable load resistors under microprocessor control again to change the gain in the input circuitry of the sensor. Moreover, U.S. Pat. No. 5,550,362 describes varying the LED current in order to calibrate a bar code scanner to a known signal and target during manufacturing.

Scanning a bar code in transmission mode, on the other hand, involves illuminating one side of a web, having the light pass through the web, and collected on the other side of the web into a photoelectric device of some kind. As a dark element in the bar code passes between the LED and sensor, the amount of light which transmits through the web is reduced. The bar code may be applied to the web using any number of printing methods (for example, wet ink processes, ink jet, thermal transfer, clear or semi-opaque label, etc.) as long as the dark elements applied to the web absorb a portion of the light passing between the LED and sensor. Several prior art references disclose, to one extent or another, point to point illumination (LED to sensor) being used to detect the presence or absence of some blocking media, to wit: U.S. Pat. No. 4,097,731 to Krause et al.; U.S. Pat. No. 4,097,732 to Krause et al; and U.S. Pat. No. 5,289,011 to Wong et al. Moreover, these references also show the use of gain control or LED current control in presence/absence applications in order to compensate for environmental changes (dust and dirt buildup, or changes in illumination intensity due to component aging).

Although some progress has been made in the art for effectively reading bar codes on web, there persists a need in the art for an apparatus and method for reading bar codes on a moving web having a range of optical densities which uses a controllable light transmissive mode that is reliable, easy to use and manufacture and that is adaptable to enormously high production speeds.

SUMMARY OF THE INVENTION

It is, therefore, an object of the invention to provide an apparatus that can read bar code indicia on a moving web that has a range of optical densities across its surface area.

It is another object of the invention to provide an apparatus that reads bar codes using a transmissive light technique.

Yet another object of the invention is to provide an apparatus that an adjust the intensity of the beam of light within a predetermined range to accommodate variances in the web optical density.

Still another object of the invention is to provide a method of reading bar codes on a moving web having a range of optical densities.

It is an important feature of the invention that a processing means controls the light intensity level of transmitted light by processing and manipulating output signals from a scanner means positioned on a side of the web opposite the light source for detecting light transmitted through the web.

The present invention is directed to overcoming one or more of the problems set forth above. Briefly summarized, according to one aspect of the present invention, an apparatus for reading bar codes on a moving web has a light source arranged on one side of the web for transmitting a beam of light through said web. The beam of light has a characteristic transmitted intensity levels corresponding to optical density variations in the moving web. A photoelectric scanner means is arranged on an opposite side of the web for detecting the beam of light transmitted through the web. The photoelectric scanner means generates an analog output signal proportional to the characteristic transmitted intensity levels of the beam of light. A converter means is provided for converting the analog output signal to digital data. Means for processing the digital data produces an analog output signal that manipulates the intensity level of the beam of light produced by the light source to within a predetermined limit.

In another embodiment of the invention, a method of reading bar codes on a moving web having a range of optical densities includes the steps of providing a source of web and means for advancing the web, as described above. A light source (described above) is arranged on one side of the web and a photoelectric scanner means is arranged on an opposite side of the web, as described above. Output signals from the scanner are converted from analog to digital data and the digital data is then manipulated by the processing means or micro-computer to regulate the intensity level of the beam of light transmitted through the web.

It is, therefore, an advantageous effect of the invention that bar code indicia, and the like, can be easily, reliably and precisely read on a moving web that has a wide range of optical densities.

BRIEF DESCRIPTION OF THE DRAWINGS

The foregoing as well as other objects, features and advantages of this invention will become more apparent from the appended Figures, wherein like reference numerals denote like elements, and wherein.

DETAILED DESCRIPTION OF THE INVENTION

Figure 1:
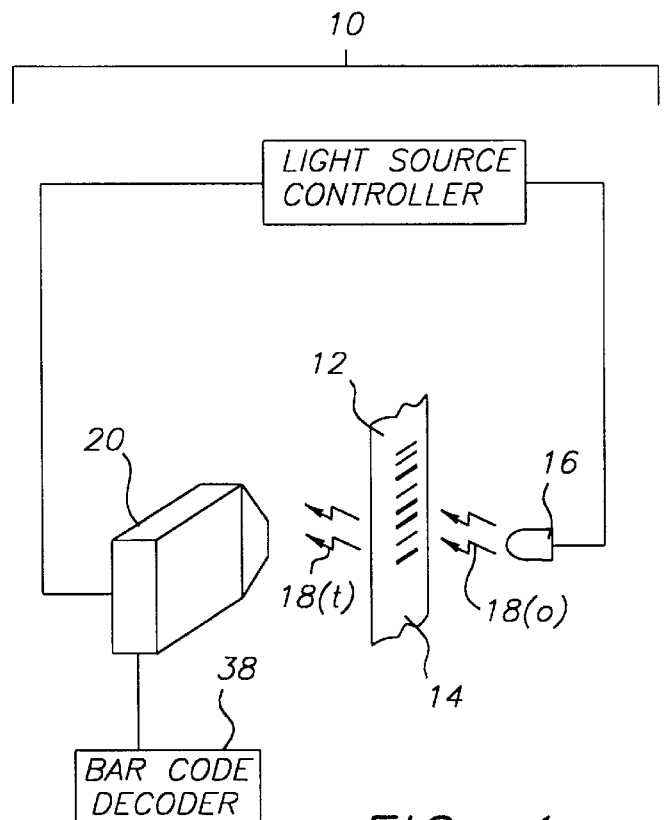
FIG. 1 is a perspective view of the apparatus of the invention.

Turning now to the drawings, and in particular to FIG. 1, apparatus 10 for reading bar codes 12 on a moving web 14 is illustrated according to the principles of the invention. A typical web 14 contemplated for use in connection with apparatus 10 includes photographic media, such as film or paper, having a range of optical densities across its surface area.

Broadly defined, apparatus 10 has a light source 16, preferably a light emitting diode (LED), arranged for transmitting light through web 14. For the purpose of clarity, light originating from light source 16 before penetrating web 14 generates beams 18(o). Beams 18(o) once transmitted through web 14 then become beams 18(t) taking on different intensity characteristics depending on the optical density of the web 14, as discussed below. Light source 16 is positioned on one side of the web 14 and a photoelectric scanner means 20 (described below) for detecting beam 18(t) of light transmitted through the web 14 is arranged on a side of the web 14 opposite the light source 16. Beams 18(t) of light transmitted through the web 14 have characteristic intensity levels corresponding to the optical density variations in the web 14. Typically, optical densities of web 14 used in connection with apparatus 10 may vary in the range from about 0.005 to 2.0 optical density units.

Figure 2:
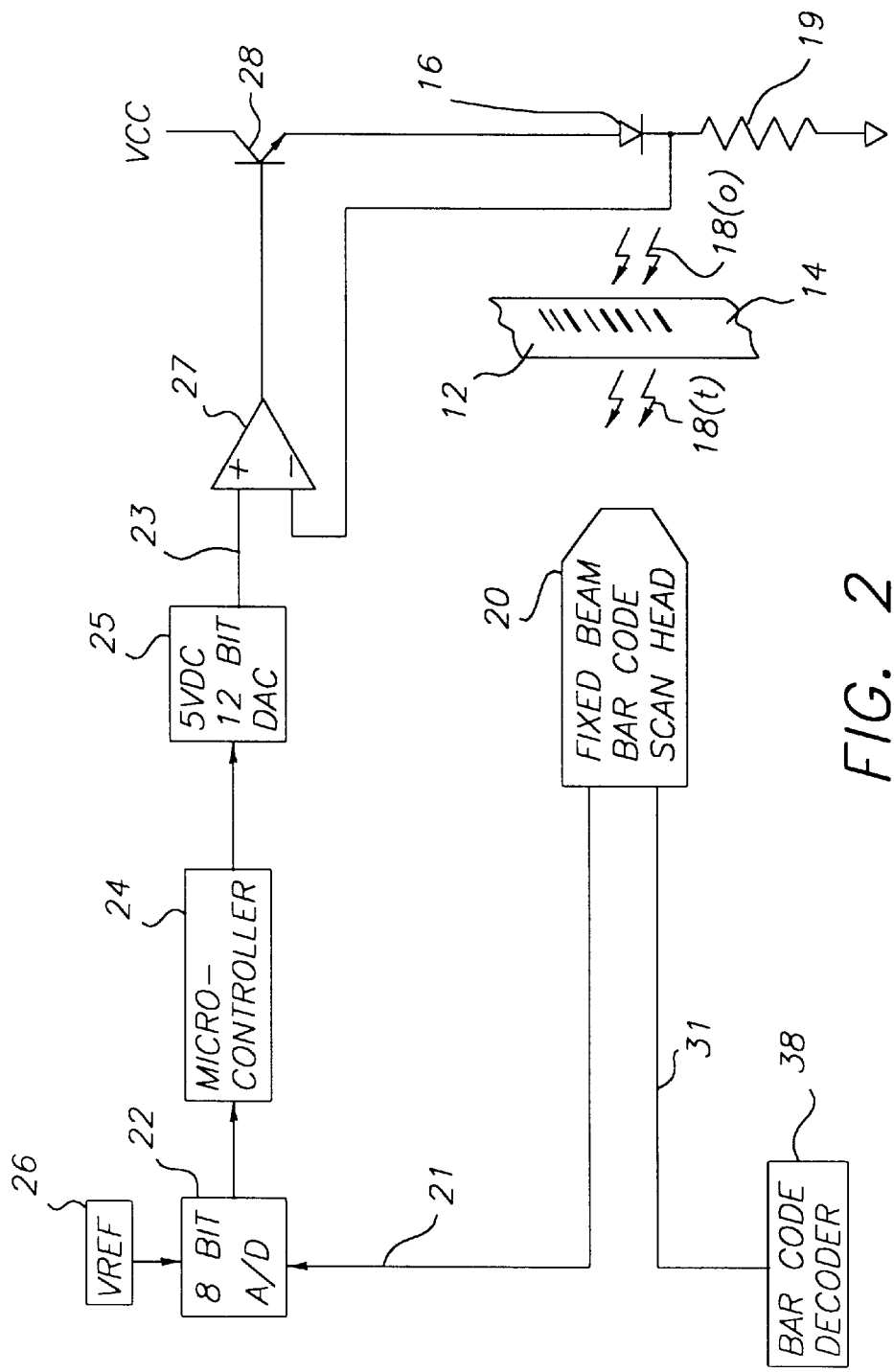
FIG. 2 is a block diagram of the control system of the invention.

According to FIG. 2, photoelectric scanner means 20 generates an analog signal 21 proportional to each of the characteristic transmitted intensity levels of the beam 18(t) of light that has passed through the various optical densities of the web 14. An analog to digital converter 22 is used to convert the analog signal 21 from the photoelectric scanner means 20 to digital data (described fully below). Processing means or micro-computer 24 (described more fully below) is used for processing the digital data and for producing an analog control signal 23 that manipulates the intensity level of the beam 18(o) of light generated by the light source 16 to within a predetermined limit, described below.

Referring again to FIG. 2, more particularly, in order to read the bar code symbols 12 in a transmission mode (i.e., where the light source 16 is on one side of the web 14 and the scanner means 20 is on the other side of the web 14) with the web 14 having density variations, the output of the LED light source 16 is changed (servoed) based on the optical density of the web 14. By changing the output of the light source 16, the photoelectric scanner means 20 having at least one scanning head (not shown) will be able to operate in its optimum range. The scanner means 20, via the scanning head, that is used to supply the digital signal 31 of the bar code symbol 12 also supplies an analog signal 21 used in the feedback loop to servo the output of the LED light source 16.

Further according to FIG. 2, scanner means 20 has an analog signal 21 that is proportional to the light detected by the scanner means 20 and a digital output signal 31. Skilled artisans will readily appreciate that the digital output signal 31 is created by circuitry internal to scanner means 20 whereby a 0 to 1 transition in the digital output signal 31 corresponds to dark/light transitions of the bar code symbol 12. Conversely, a 1 to 0 transition in the digital output signal 31 corresponds to light/dark transitions of the bar code symbol 12. The analog signal 21 is digitized by analog-to-digital converter 22 and sent to the micro-computer 24. Micro-computer 24 then processes this input and then outputs to a digital-to-analog converter 25 to set the proper level for the analog control signal 23 that drives the LED light source 16.

Referring still to FIG. 2, processing means or micro-computer 24, moreover, servos the output of the LED light source 16 based on the analog signal 21 from the scanner means 20. Micro-computer 24 compares the analog signal 21 received from the scanner means 20 to four limits illustrated in FIG. 3. According to FIG. 3, one pair of limits ($V_{H1}$ 30 and $V_{L1}$ 32) defines the optimum range over which the scanner means 20 will best operate. As best seen in FIG. 2, as long as the analog signal 21 from scanner means 20 is within this control range no change in the output of the LED light source 16 is made.

Figure 3:
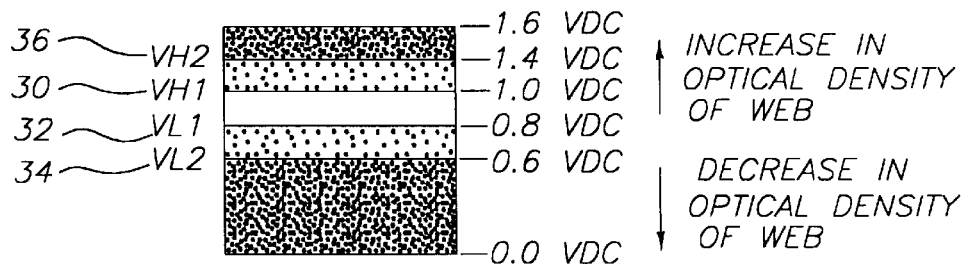
FIG. 3 is a diagram of the voltage limits.

According to FIGS. 2 & 3, our experience indicates that when the optical density of the moving web 14 decreases such that the analog input signal from light source 16 is not only beyond the $V_{L1}$ 32 limit but also beyond a second limit, $V_{L2}$ 34, the micro-computer 24 will then decrease the output of the LED light source 16 by one-half of its existing output, check the analog signal 21, and continue to decrease the output of the LED light source 16 by one half as long as the analog signal 21 is beyond the $V_{L2}$ 34 limit.

Referring to FIGS. 2–3, when the optical density of the moving web 14 decreases such that the analog signal 21 is beyond the $V_{L1}$ 32 limit but not the $V_{L2}$ 34 limit, the micro-computer 24 will sequence accordingly: decrease the output of the LED light source 16 by some predetermined amount; check to see if the analog signal 21 is within the $V_{L1}$ 32 and $V_{H1}$ 30 limits; and, if not, then continue to decrease the output of the LED light source 16 by some predetermined amount until the analog signal 21 is within the operating limits.

With further regards to FIGS. 2 & 3, when the optical density of the web 14 increases such that the analog signal 21 is beyond the operating limits, the micro-computer 24 will then delay making any changes to the output of the LED light source 16 for a pre-defined time. If during this time the analog signal 21 ever goes back to within its operating range then the delay is aborted. This time delay in changing the output of the LED light source 16 prevents the micro-computer 24 from servoing the output of the LED light source 16 when a bar code symbol 12, human readable text, or a web splice momentarily passes in the field of view of the scanner head of scanner means 20. When a time-out does occur, the micro-computer 24 will then increase the output of the LED light source 16 by a predetermined amount based on whether the analog signal 21 is beyond a second limit ($V_{H2}$ 36). Micro-computer 24 will recheck the analog signal 21, and continue to increase the output of the LED light source 16 by a predetermined amount depending whether the analog signal 21 is beyond the $V_{H2}$ 36 limit. The incremental amount of output change of the LED light source 16 is much greater when the analog signal 21 is beyond the $V_{H2}$ 36 limit than when it is just beyond the $V_{H1}$ 30 limit.

Referring to FIG. 2, as previously described, the apparatus 10 of the invention includes an analog-to-digital converter 22, a micro-computer 24, a digital-to-analog converter 25 with associated components, a LED light source 16, and a fixed beam bar code scanner means 20 having at least one scan head.

Preferably, scanner means 20 including a fixed beam bar code scan head, i.e., one in which the incident light beam is stationary with respect to the sensor, is a commercially available unit such as a Welch Allyn model 6500 or Datalogic model F30. Scanner means 20, preferably, has the integrated illumination LED's (not shown) disabled. These LED's would normally be used to scan a bar code in a reflective mode. Scanner means 20 of the invention provides a digital signal 31 from the internal sensor (not shown). This digital signal 31 provides a digitized representation of what the scanner means 20 sees and is normally connected to a bar code decoder 38. The preferred scanner means 20 also provides an analog signal 21 from the internal sensor (not shown). When using the Welch Allyn scanner means 20, the voltage level of the analog signal 21 is inversely related to the level of light the sensor sees. When the sensor sees no light, the voltage level of the analog signal 21 will be approximately 1.6 VDC. The voltage level of the analog signal 21 will decrease to 0.0 VDC as the light level that the sensor sees increases.

According to FIG. 2, the analog signal 21 provided from the scanner means 20 is connected to an analog-to-digital converter 22. The preferred analog-to-digital converter 22 uses 8 bits of resolution. An external reference voltage 26 is supplied to the analog-to-digital converter 22. In this example, two different reference voltages may be used for the analog-to-digital converter 22, 5.0 VDC or 2.5 VDC. This allows for the digital resolution or step size to be chosen depending on the voltage range to be input to the analog to digital converter 22. In this example, 2.5 VDC is used for the reference input voltage into the analog-to-digital converter 22, resulting in a digital resolution or step size of 9.7 millivolts per bit.

Still referring to FIGS. 2 and 3, micro-computer 24 is used to read in digital information from the analog-to-digital converter 22. This information is processed using an algorithm, described generally below. The output from the algorithm is applied to a digital-to-analog converter 25. The goal of the algorithm is to maintain the voltage level ($V_{in}$) of the analog signal 21 read in from the analog-to-digital converter 22 within a given range. In this example, the voltage range is defined by a first upper limit ($V_{H1}$ 30 at 1.0 VDC), a second upper limit ($V_{H2}$ 36 at 1.4 VDC), a first lower limit ($V_{L1}$ 32 at 0.8 VDC), and a second lower limit ($V_{L2}$ 34 at 0.6 VDC) as shown in FIG. 3. The voltage limits 30, 32, 34, 36 are changeable using software commands to the micro-computer 24. Depending on the voltage of analog signal 21 read in from the analog-to-digital converter 22, the algorithm will process the data and adjust the value sent to the digital-to-analog converter 25. In this example, a 5 VDC digital-to-analog converter 25 is used with 12 bit resolution. This results in a digital resolution or step size of 1.2 millivolts per bit.

Depicted in FIG. 4, the algorithm consists of four checks of $V_{in}$ of analog signal 21, described in details below. With regards to the first check, designated 40, if $V_{in}$ of analog signal 21 is greater than $V_{H2}$ 36, then a second check 42 is made of the digital-to-analog converter 25 (DAC) count value. If the DAC 25 count is equal to a predetermined maximum count value (MAX), then the algorithm will proceed to check $V_{in}$ of the analog signal 21 as in check 40. A read delay of 1 millisecond 62 is used before $V_{in}$ of analog signal 21 is checked again to allow for response time in the feedback loop of the system. If the DAC 25 count is not equal to the MAX count, then a check 46, 48 is made of TIMERSTATE (TIMERSTATE or TS is a variable used for program flow control which may have only 4 values: RST1; RST2; ON; or DONE).

Referring again to FIG. 4, if TS is not DONE 46, and TS is RST1 or RST2 48 then a delay timer (250 milliseconds in this example, but not shown) is started in the micro-computer 24 (FIG. 2) and TS is set to ON 50. The algorithm will proceed to check $V_{in}$ of analog signal 21. The micro-computer 24 will automatically set TS to DONE after the delay timer has expired unless the value of TS has been changed. The 250 millisecond delay time is used to negate or ignore the temporary effects to the voltage level of analog signal 21 as printing or splices pass between the scanner means 20 and light source 16. As printing or splices pass between the scanner means 20 and light source 16, the voltage of the analog signal 21 will temporarily rise. This effect needs to be ignored in order to maintain uniform illumination of the web 14, and so as not to be interpreted by the algorithm as a change in base web density. The 250 millisecond delay time used in this example is changeable using software commands to the micro-computer 24. The 250 millisecond delay time may be changed to accommodate differences in printing, splice lengths, and web speeds.

If TS is DONE, then TS is set to RST1 52. $V_{in}$ of analog signal 21 is checked again 54. If $V_{in}$ of analog signal 21 is now greater than $V_{H1}$ 30 after the initial 250 millisecond time delay, then the DAC 25 count will be incremented by a predetermined value SVM 56. This will continue until either $V_{in}$ of analog signal 21 is equal to or drops below $V_{H1}$ 30 or the DAC 25 count exceeds MAX 54, 58. The predetermined value SVM is changeable using software commands to the micro-computer 24. The predetermined value SVM may be changed to control the rate at which the algorithm responds to a large increase in web density. If the DAC 25 count exceeds MAX, the DAC 25 count will be set to MAX 60 and the algorithm will proceed to check $V_{in}$ of analog signal 21. A read delay of 1 millisecond 64 is used in the control loop to allow for the response time in the feedback loop of the system.

In another case 44, if $V_{in}$ of analog signal 21 is greater than $V_{H1}$ 30, a check is made of TS 66, 68. If TS is not DONE and not RST2 66 and is RST1 68, then a delay timer is started in the microcontroller and TS is set to ON 70. The algorithm will proceed to check $V_{in}$ of analog signal 21.

If TS is DONE or RST2 66, then TS is set to RST2 72. The DAC 25 count will be incremented by a predetermined value SVN 74. The predetermined value SVN is changeable using software commands to the micro-computer 24. The predetermined value SVN may be changed to control the rate at which the algorithm responds to a small change in web density. If the DAC 25 count exceeds MAX 76, the DAC count will be set to MAX 78. The algorithm will proceed to check $V_{in}$ of analog signal 21.

Referring once again to FIG. 4, a further case 82, if $V_{in}$ of analog signal 21 is less than $V_{L2}$ 34, then TS is set to RST1 80 and the DAC 25 count is divided by 2, designated as feature 84. The algorithm will proceed to check $V_{in}$ of analog signal 21.

Figure 4:
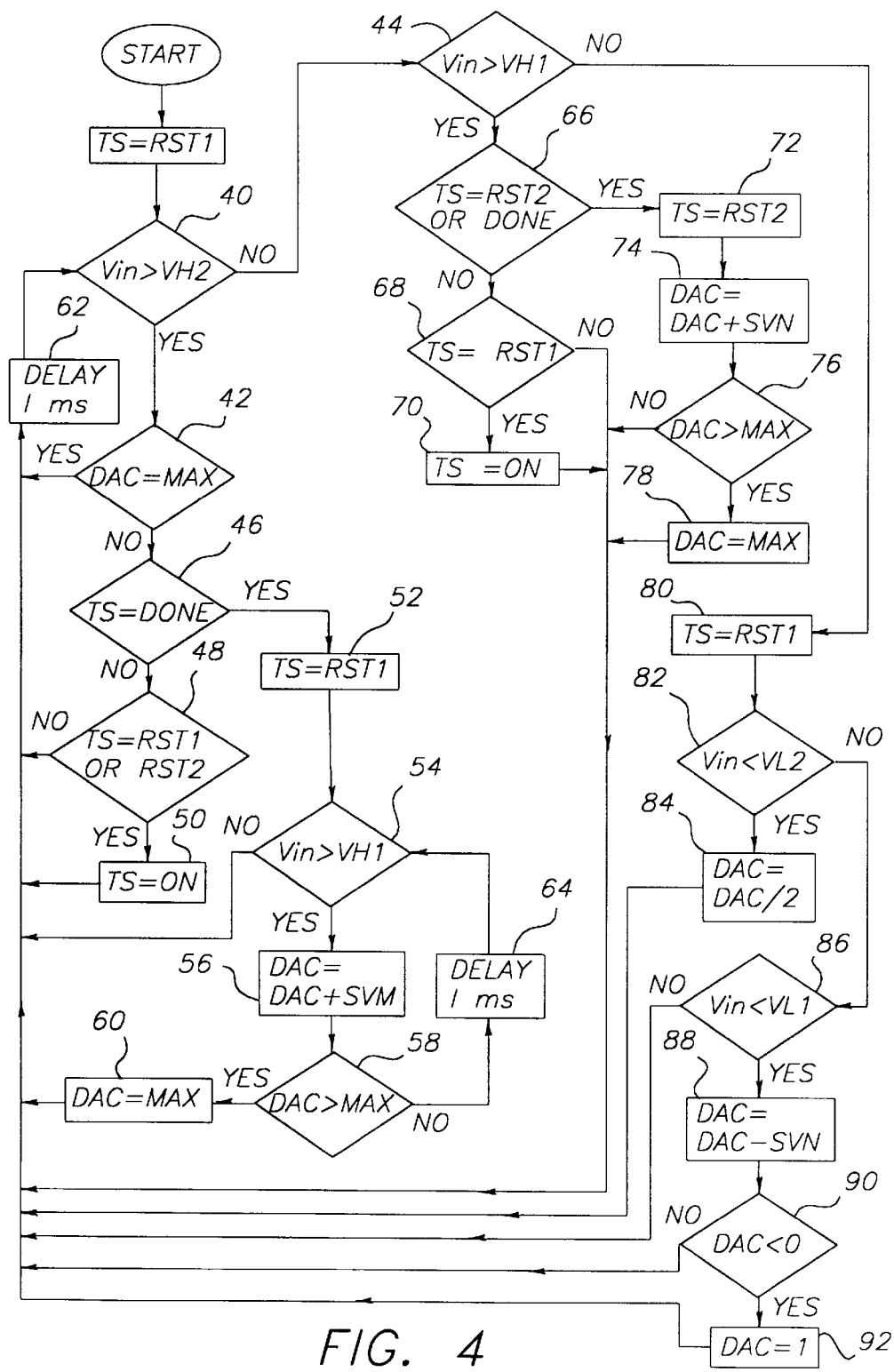
FIG. 4 is a flow chart of the algorithm that governs the processing means of the invention during normal operation; and, FIG. 5 is a flow chart of the algorithm that governs the processing means of the invention during startup operation.

Referring further to FIG. 4, finally 86, if $V_{in}$ of analog signal 21 is less than $V_{L1}$ 32, then TS is set to RST1 80 and the DAC 25 count will be decrement by SVN 88. If the resulting DAC 25 count is less than 0 (see feature 90), then the DAC count is set to 1 (see feature 92). The algorithm will proceed to check $V_{in}$ of analog signal 21.

With further reference to FIG. 4, if $V_{in}$ of analog signal 21 is determined to be within the correct operating range (between $V_{L1}$ 32 and $V_{H1}$ 30), then TS is set to RST1 80 and the algorithm will proceed to check $V_{in}$ of analog signal 21.

Referring to FIGS. 2 and 4, software commands to the micro-computer 24 are available which allow for control of the LED light source 16 to be enabled or disabled. Software commands to the micro-computer 24 are also available to force and hold a specific DAC 25 count.

Figure 5:
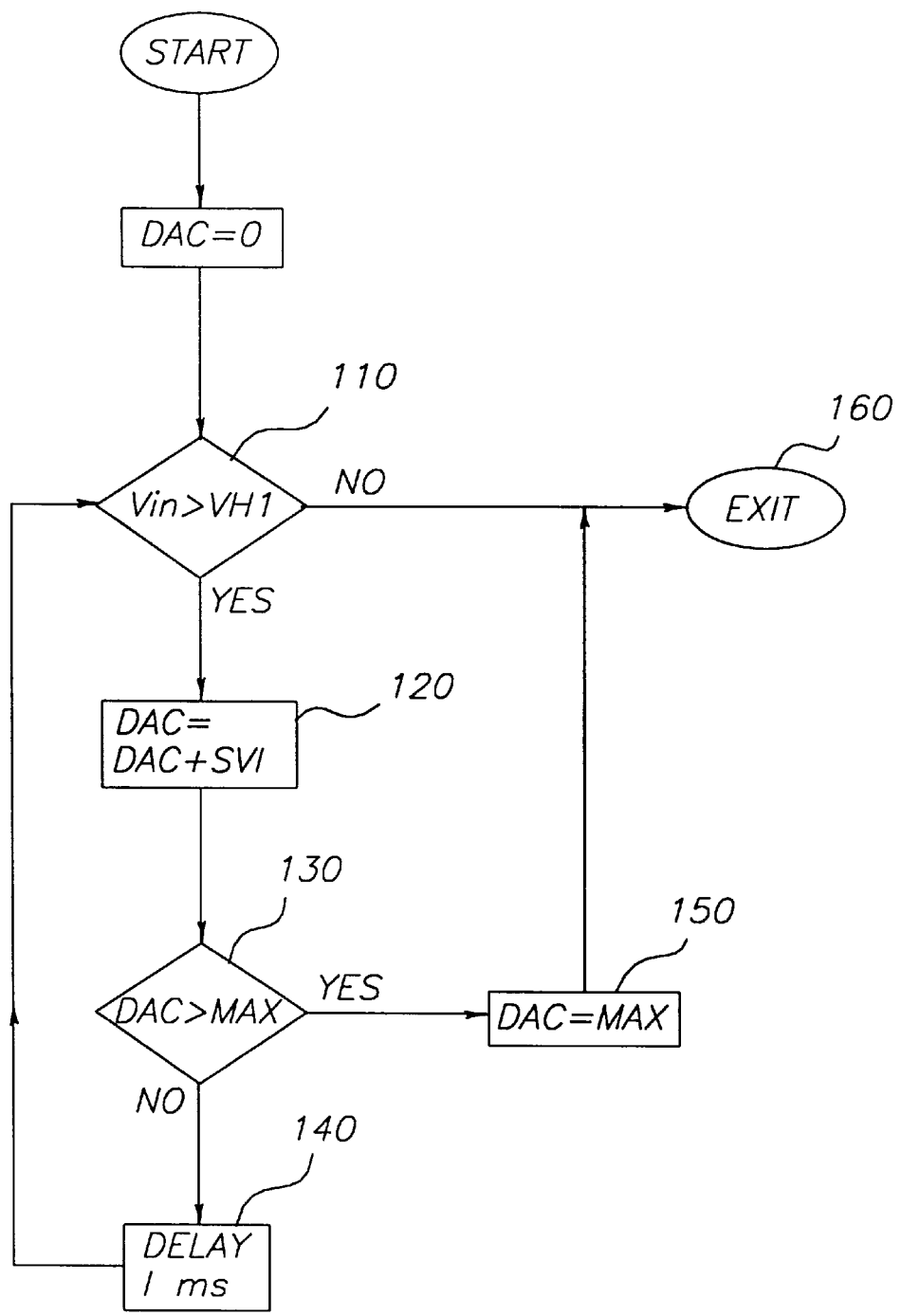

When the light source LED light source 16 is initially enabled or upon power up, an initialization algorithm is run to initialize the DAC 25 count. In FIG. 5, a flow chart of the initialization algorithm is presented.

According to FIG. 5, if $V_{in}$ of the analog signal 21 is greater than $V_{H1}$ 30, 110, then the DAC 25 count will be incremented by SVI 120 until either $V_{in}$ of the analog signal 21 is less than or equal to $V_{H1}$ 30, 110 or the DAC 25 count exceeds MAX 130. The predetermined value SVI is changeable using software commands to the micro-computer 24 (FIG. 2). The predetermined value SVI may be changed to control the rate at which the algorithm initializes the DAC 25 count. If the DAC 25 count exceeds MAX, the DAC count will be set to MAX 150 and the algorithm will exit 160. A delay of 1 millisecond 140 is used in the initialization loop to allow for the response time in the feedback loop of the system.

Referring to FIGS. 2 and 5, the voltage corresponding to analog control signal 23 from the DAC 25 is fed into a constant current amplifier circuit to provide a current source to the LED light source 16. The constant current amplifier circuit consists of an operational amplifier 27, transistor 28, and current limiting resistor 29. The transfer function of the constant current amplifier circuit is $I_f = V_i/R$, where $I_f$ is the forward current through the light source LED light source 16, $V_i$ is the input voltage 23 to the constant current amplifier circuit, and R is the resistance value of the current limiting resistor 29. The value of the current limiting resistor 29 is chosen to allow the system to function on the maximum density web to be used.

Skilled artisans will appreciate that the above control technique can be scaled in such a way as to have the micro-computer 24 sample multiple input channels of analog signal 21 using a single analog-to-digital converter 22 with multiple inputs. The same micro-computer 24 may also control multiple LED light sources 16 using one or more digital-to-analog converters 25. Using software commands to the micro-computer 24, individual channels may be enabled or disabled. Digital-to-analog counts may also be set and held for individual channels.

The invention has been described with reference to a preferred embodiment; However, it will be appreciated that variations and modifications can be effected by a person of ordinary skill in the art without departing from the scope of the invention.

| PARTS LIST | |
|---|---|
| 10 | apparatus |
| 12 | bar code |
| 14 | web |
| 16 | light source |
| 18(o) | incident light beam |
| 18(t) | transmitted light beam |
| 19 | current limiting resistor |
| 20 | photoelectric scanner means |
| 21 | analog output signal |
| 22 | analog-to-digital converter |
| 23 | output control signal |
| 24 | processing means or micro-computer |
| 25 | digital-to-analog converter or DAC |
| 26 | voltage reference |
| 27 | operational amplifier |
| 28 | transistor |
| 30 | $V_{H1}$ |
| 31 | digital bar code signal |
| 32 | $V_{L1}$ |
| 34 | $V_{L2}$ |
| 36 | $V_{H2}$ |
| 38 | bar code decoder |
| 40 | first case (Vin > VH2) |
| 42 | check (DAC = MAX) |
| 44 | another case (Vin > VH1) |
| 46 | check (TS = DONE) |
| 48 | check (TS = RST1 or TS = RST2) |
| 50 | instruction (TS = ON) |
| 52 | instruction (TS = RST1) |
| 54 | check (Vin > VH1) |
| 56 | value (DAC = DAC + SVM) |
| 58 | check (DAC > MAX) |
| 60 | value (DAC = MAX) |
| 62 | delay 1 millisecond |
| 64 | delay 1 millisecond |
| 66 | check (TS = RST2 OR DONE) |
| 68 | check (TS = RST1) |
| 70 | value (TS = ON) |
| 72 | value (TS = RST2) |
| 74 | value (DAC = DAC + SVM) |
| 76 | check (DAC > MAX) |
| 78 | value (DAC = MAX) |
| 80 | value (TS = RST1) |
| 82 | further case (Vin < VL2) |
| 84 | value (DAC = DAC/2) |
| 86 | finally (Vin < VL1) |
| 88 | value (DAC = DAC − SVN) |
| 90 | check (DAC < 0) |
| 92 | check (DAC = 1) |
| 110 | first case (Vin > VH1) |
| 120 | value (DAC = DAC + SVI) |
| 130 | check (DAC > MAX) |
| 140 | delay 1 millisecond |
| 150 | check (DAC = MAX) |
| 160 | EXIT |

What is claimed is:

1. An apparatus for reading bar codes on a moving web, comprising:

a light source arranged on one side of the web for transmitting a beam of light through said web, said beam of light having a plurality of characteristic transmitted intensity levels corresponding to optical density variations in said moving web;

a photoelectric scanning means arranged on a side of said web opposite said light source for detecting said beam of light transmitted through said web, said photoelectric scanning means generating an analog output signal proportional to each one of said plurality of characteristic transmitted intensity levels of said beam of light;

a converter means for converting said analog output signal to digital data;

means for discriminating between light intensity changes associated with variations in said optical density of said web to light intensity changes associated with artifacts in said web, said means comprising a time delay operably associated with said processing means for delaying changes of said output analog signal of said processing means; and, means for processing said digital data, said means producing an analog output signal that manipulates the intensity level of said beam of light produced by said light source to within a predetermined limit.

2. The apparatus recited in claim 1 wherein said photoelectric scanning means further generates a digital output signal corresponding to dark to light and light to dark transition regions in said bar code.

3. The apparatus recited in claim 1 wherein said digital data is manipulated so as to maintain a predetermined range.

4. The apparatus recited in claim 1, wherein said light source is a light emitting diode.

5. The apparatus recited in claim 1 wherein said optical density of said web varies from about 0.005 to about 2.0.

6. The apparatus recited in claim 1, wherein said means for processing compares said digital data corresponding to output signals from said photoelectric scanner means to a first upper limit ($V_{H1}$) and a first lower limit ($V_{L1}$), said comparison determining changes in the intensity level of said beam of light transmitted through said web, said intensity level changing when said comparison is beyond said first upper limit and first lower limit, said changes corresponding to optical density variations of said moving web varies.

7. The apparatus recited in claim 1, wherein said means for processing compares said digital data corresponding to output signals from said photoelectric scanner means, to a second upper limit ($V_{H2}$) and a second lower limit ($V_{L2}$), wherein said comparison determines changes in the intensity level of said beam of light transmitted through said web, said intensity changing when said comparison is beyond said second upper limit and second lower limit, said changes corresponding to optical density variations of said moving web varies.

8. A method of reading bar codes on a moving web having a range of optical densities, comprising the steps of:

providing a source of web;

providing means for advancing said web;

providing a light source arranged on one side of the web for transmitting a beam of light therethrough;

providing a scanner means for sensing the transmitted beam of light passing through the web, said scanner means being arranged on a side of said web opposite said light source forming a light transmissive zone;

providing means for processing and manipulating output signals from said scanner means activating said light source and said scanner means;

advancing said web through said light transmissive zone;

converting said output analog signal from said scanner means to digital data; and, processing and manipulating said digital data so as to control the light intensity level of the beam of light passing through the web to within predetermined limits, said processing and manipulating including comparing said digital data to a first upper limit ($V_{H1}$) and a first lower limit ($V_{L1}$).

9. The method recited in claim 8 wherein the step of processing and manipulating further includes the step of changing the light intensity level of said beam of light when the comparison is beyond either the first upper limit ($V_{H1}$) or the first lower limit ($V_{L1}$).

10. The method recited in claim 8 wherein the step of processing and manipulating said digital data corresponding to output signals from said photoelectric scanner means includes the step of comparing said digital data to a second upper limit ($V_{H2}$) and a second lower limit ($V_{L2}$).

11. The method recited in claim 10 wherein the step of processing and manipulating further includes the step of changing the light intensity level of said beam of light when the comparison is beyond either the second upper limit ($V_{H2}$) or the second lower limit ($V_{L2}$).

* * * * *